(No Model.)

E. P. LYNN.
FILTER.

No. 576,209. Patented Feb. 2, 1897.

WITNESSES:
William J. Peck
William C. Fay

INVENTOR
Emore P. Lynn
BY Chas. M. Peck
his ATTORNEY

THE NORRIS PETERS CO., PHOTO-LITHO., WASHINGTON, D. C.

UNITED STATES PATENT OFFICE.

ELMORE P. LYNN, OF CINCINNATI, OHIO, ASSIGNOR TO THE LYNN FILTER MANUFACTURING COMPANY, OF SAME PLACE.

FILTER.

SPECIFICATION forming part of Letters Patent No. 576,209, dated February 2, 1897.

Application filed February 27, 1896. Serial No. 581,057. (No model.)

*To all whom it may concern:*

Be it known that I, ELMORE P. LYNN, a citizen of the United States, residing at Cincinnati, in the county of Hamilton and State of Ohio, have invented certain new and useful Improvements in Filters, of which the following is a full, clear, and exact description, reference being had to the accompanying drawings, forming part of this specification.

My invention relates to that class of filters in which the water is forced through the filtering medium under pressure, usually the pressure of the mains of a city waterworks; and it has for its object the provision of means whereby the pressure of the water is exerted equally both on the interior and exterior of the filtering medium, which has one or more self-contained filtering-channels for the reception and escape of the filtered water, and also in the provision of means for effectually cleaning both the interior and exterior surfaces of the filtering medium without removing or handling any of its parts.

The novelty of my invention will be hereinafter set forth, and specifically pointed out in the claims.

Figure 1:
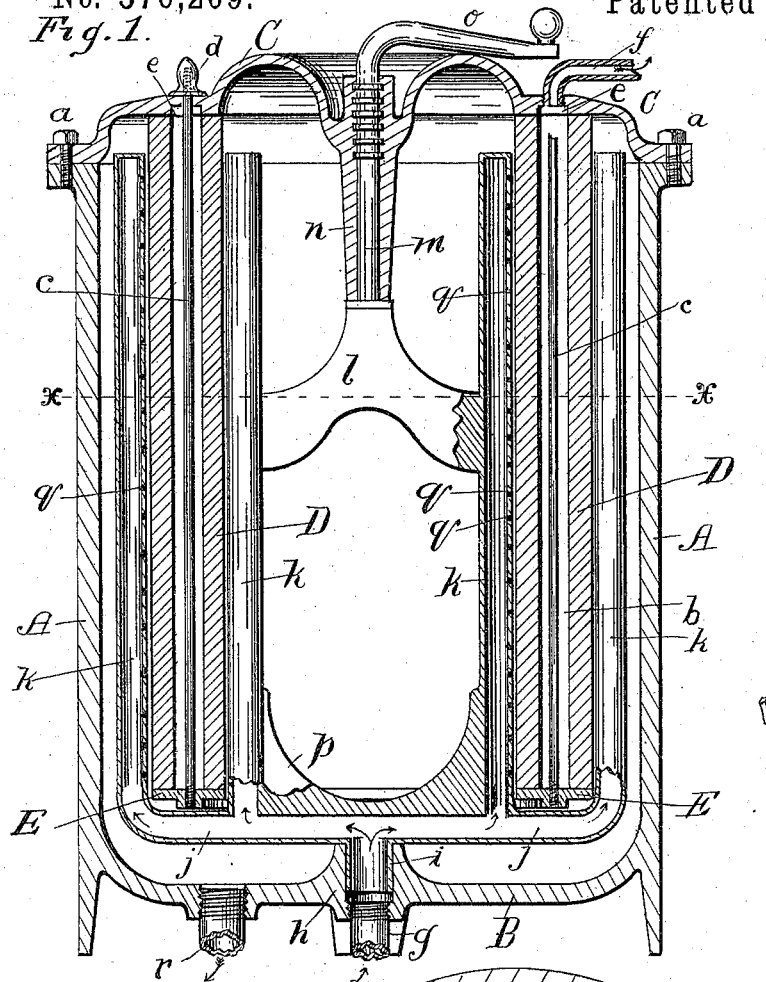
Figure 3:
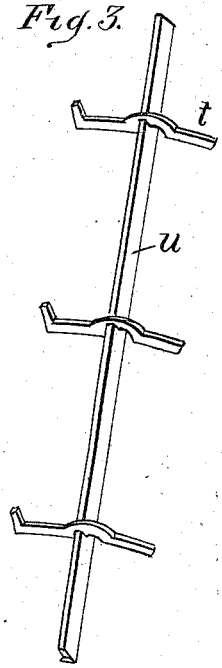
Figure 2:
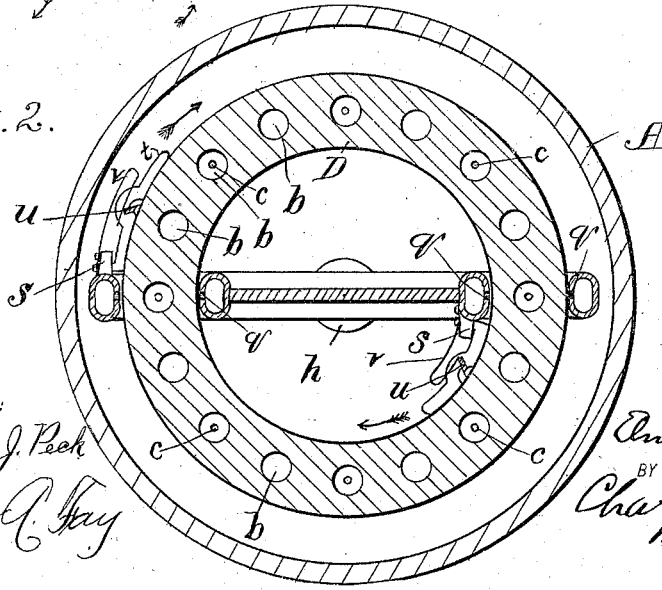

In the accompanying drawings, Figure 1 is a central sectional elevation. Fig. 2 is a transverse section on the dotted line $xx$ of Fig. 1. Fig. 3 is a perspective view of one of the scraper-bars and its guide-supports.

The same letters of reference are used to indicate identical parts in all the figures.

A is a metal vessel, in this instance cylindrical, with an integral bottom B and a removable top cap C, held in place by screws or bolts $a$, passed through flanges in both members. Fitted within the vessel A is the filtering medium D, which is a cylinder constructed of tripoli or any other properly porous and kiln-dried earthenware material. This filtering-cylinder has formed through it longitudinally from end to end a series of equidistant filtering-chambers $b$, (see Fig. 2,) and the manner of supporting this filtering-cylinder within the vessel A is as follows: Its bottom rests upon an annular metal ring E, with an interposed rubber gasket or other packing to form a water-tight joint, and hanging tie-rods $c$ are passed down through perforations in the cap C and through the alternating filtering or escape chambers $b$, and have their lower threaded ends screwed into the ring E and their upper projecting threaded ends fitted with cap-nuts $d$, bearing upon the cap C and serving to lock the top of the cylinder D to the under side of the cap C, with an interposed rubber gasket or other packing to form a water-tight joint. In this way the cylinder D is suspended and locked to the top cap C within the vessel A. An annular groove or channel $e$, on the under side of the cap C, connects all of the escape-chambers $b$, and it is tapped by an outflow-pipe $f$ for the filtered water.

The water to be filtered enters through a pipe $g$, screwed into a central boss $h$ in the bottom B of the vessel A. Journaled in this boss $h$ within the vessel A is a short pipe $i$, having lateral branches $j$, extending out beneath the ring E, each branch carrying a vertical pipe $k$ in close proximity to the interior and exterior surfaces of the cylinder D and extending almost the entire length thereof.

The interior pipes $k$ are connected by a spider $l$ about midway of the cylinder D, and this spider has secured to it the lower end of a crank-shaft $m$, journaled with water-tight connections through a boss $n$ in the cap C and having an exterior operating-handle $o$. At their lower ends the interior pipes $k$ are preferably connected by a second bracing-spider $p$, the whole constituting a tubular framework to be rotated by the handle $o$ around the cylinder D.

The water enters through pipe $g$, branches $j$, and pipes $k$ and is forced through perforations $q$ in the latter against both the inner and outer surfaces of the cylinder D until the vessel A is completely filled, whereupon the pressure of the water is exerted upon the cylinder D and percolates through the same into the chambers $b$, and filling the same passes out through the channel $e$ and pipe $f$ to the point of delivery in a perfectly-filtered condition. By this construction there is no liability whatever of the water-pressure breaking the filtering medium, for it is exerted equally on both surfaces thereof, thus enabling the filtering medium to be made of comparatively fragile material and to be made of as large diameter as is desired.

While I prefer to construct the filtering-channels b as shown, yet my invention is not to be restricted to the number or shape in cross-section of these filtering-chambers.

In the bottom B is an outflow-pipe r, controlled by a cock (not shown) for emptying the vessels A of collected impurities, and to effectually cleanse the cylinder D, I secure to lugs s on one of the outer and inner pipes k a number of recessed guide-pieces t, in which are carried two scraper-bars u, yieldingly held against the exterior and interior surfaces of the cylinder D by means of flat springs v, carried by the lugs s and bearing against the bars u. The bars u extend the entire length of the cylinder D, and when the handle o is turned to rotate the tubular framework they plane off or scrape from the exterior and interior surfaces of the cylinder D all adhering impurities. During this cleansing of the cylinder D the cock in the pipe r should be opened to permit the impure water in the vessel A to escape, and then the jets, through the perforations q in the pipes k, impinge upon both surfaces of the cylinder D to aid in effectually cleansing the same, as will be readily understood.

While I prefer the employment of two pairs of pipes k on each side of the cylinder D, yet a large part of the advantage of my invention would be obtained if one pair were omitted, taking care only that each pipe of the pair retained should carry a scraping-bar u.

Having thus fully described my invention, I claim—

1. In a filter, the combination of a filtering vessel, a filtering medium therein in the form of a true cylinder with one or more self-contained escape-chambers extending longitudinally of the same and connected with the exhaust-chamber for the filtered water, water-tight connections between said filtering vessel and filtering medium, and cleansing mechanism applied to the exterior and interior surfaces of said filtering medium with means for rotating said cleansing mechanism around the filtering medium, substantially as described.

2. In a filter, the combination of a filtering vessel, a filtering medium therein in the form of a true cylinder with one or more self-contained escape-chambers extending longitudinally of the same and communicating with an exit-channel for the filtered water, water-tight connections between said filtering vessel and filtering medium, and scraping-bars applied to the exterior and interior surfaces of said filtering medium with means for rotating said bars around the filtering medium, substantially as described.

3. In a filter, the combination of a filtering vessel, a filtering medium therein in the form of a true cylinder with one or more self-contained escape-chambers extending longitudinally of the same and communicating with an exit-channel for the filtered water, water-tight connections between said filtering vessel and filtering medium, inflow-pipes extending longitudinally of the filtering medium on both its interior and exterior surfaces and provided with perforations adjacent to the filtering medium, yielding scraper-bars carried by said pipes, and means for rotating said pipes and bars, substantially as described.

4. The herein-described filter composed of the vessel, A, with removable cap, C, having channel, e, the filtering medium, D, suspended in said vessel from the cap, C, by means of the tie-rods, c, and ring, E, said filtering medium being provided with escape-chambers, b, communicating with the channel, e, the tubular frame composed of the pipes, j, k, journaled in the vessel, A, and receiving the inflowing water, the pipes, k, being provided with perforations, the yielding scraper-bars, u, bearing against both surfaces of the filtering medium and carried by the pipes, k, and means for rotating said tubular frame, substantially as and for the purpose specified.

ELMORE P. LYNN.

Witnesses:
J. Thomson Cross,
Bernard J. Hausfeld.